United States Patent
Wouhaybi et al.

(10) Patent No.: US 9,448,084 B2
(45) Date of Patent: Sep. 20, 2016

(54) DYNAMIC NAVIGATION SERVICE

(75) Inventors: Rita H. Wouhaybi, Portland, OR (US); Alexandra C. Zafiroglu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/976,496

(22) PCT Filed: Mar. 31, 2012

(86) PCT No.: PCT/US2012/031763
§ 371 (c)(1),
(2), (4) Date: Sep. 11, 2014

(87) PCT Pub. No.: WO2013/147916
PCT Pub. Date: Oct. 3, 2013

(65) Prior Publication Data
US 2015/0025792 A1    Jan. 22, 2015

(51) Int. Cl.
*G01C 21/12*    (2006.01)
*G01C 21/34*    (2006.01)
*G08G 1/0968*   (2006.01)
*H04W 4/02*     (2009.01)

(52) U.S. Cl.
CPC ....... *G01C 21/3484* (2013.01); *G08G 1/09685* (2013.01); *G08G 1/096811* (2013.01); *G08G 1/096838* (2013.01); *G08G 1/096883* (2013.01); *H04W 4/028* (2013.01)

(58) Field of Classification Search
CPC .............. G01C 21/3484; G08G 1/096811; G08G 1/096838; G08G 1/096883; H04W 4/028

USPC ....... 701/424, 400, 425–426, 432, 438, 538, 701/541
See application file for complete search history.

(56) References Cited

U.S. PATENT DOCUMENTS

| | | | |
|---|---|---|---|
| 7,783,421 B2* | 8/2010 | Arai et al. | 701/420 |
| 8,566,029 B1* | 10/2013 | Lopatenko et al. | 701/426 |
| 2008/0167806 A1 | 7/2008 | Wheeler et al. | |
| 2009/0157613 A1 | 6/2009 | Strohmenger et al. | |
| 2009/0182498 A1 | 7/2009 | Seymour | |
| 2010/0076674 A1 | 3/2010 | Berot et al. | |

FOREIGN PATENT DOCUMENTS

| | | |
|---|---|---|
| CN | 101903903 A | 12/2010 |
| JP | 2009257965 A | 11/2009 |
| JP | 2011145756 A | 7/2011 |
| JP | 2011-248812 A | 12/2011 |

(Continued)

OTHER PUBLICATIONS

International Search Report and Written Opinion received for PCT application No. PCT/US2012/031763, mailed on Nov. 28, 2012, 9 pages.

(Continued)

*Primary Examiner* — Thomas G Black
*Assistant Examiner* — Luke Huynh
(74) *Attorney, Agent, or Firm* — Jordan IP Law, LLC (57) ABSTRACT

Systems and methods may provide for implementing a dynamic navigation service. In one example, the method may include generating user behavior data for a user, generating community user behavior data, generating a user suggested route, and generating a community user suggested route.

26 Claims, 2 Drawing Sheets

(56) References Cited

FOREIGN PATENT DOCUMENTS

| JP | 2011248812 A | 12/2011 |
|---|---|---|
| KR | 20100001470 A | 1/2010 |
| KR | 10-2010-0122195 A | 11/2010 |
| KR | 10-2011-0005082 A | 1/2011 |
| WO | WO2013147916 A1 | 10/2013 |

OTHER PUBLICATIONS

International Preliminary Report on Patentability received for PCT Patent Application No. PCT/US2012/031763, mailed on Oct. 9, 2014, 6 pages.

Office Action for Japanese Patent Application No. 2015-500416, dated Aug. 25, 2015, 8 pages, includes 4 pages of English Translation.

European Search Report for EP Patent Application No. 12872776.5, mailed Jan. 7, 2016, 6 pages.

Office Action for Japanese Patent Application No. 2015-500416, mailed Feb. 23, 2016, 6 pages including 3 pages of English translation.

Office Action for Chinese Patent Application No. 201280072141.3, dated Mar. 31, 2016, 30 pages including 21 pages of English translation.

Office Action for Korean Patent Application No. 10-2014-7026664, dated Jun. 23, 2016, 17 pages including 9 pages of English translation.

\* cited by examiner

DYNAMIC NAVIGATION SERVICE

BACKGROUND

1. Technical Field

Embodiments generally relate to dynamic direction recommendations. More particularly, embodiments relate to utilizing navigation behavior of a local community to dynamically recommend directions to a user.

2. Discussion

Mapping services typically recommend directions based on rigid criteria (e.g., shortest distance, shortest period of time). In some cases, this may be inadequate. For example, in the case of a user who is unfamiliar with an area, the user may instead want directions based on routes taken by locals (e.g., a route that avoids a known road closure or is safer at night).

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
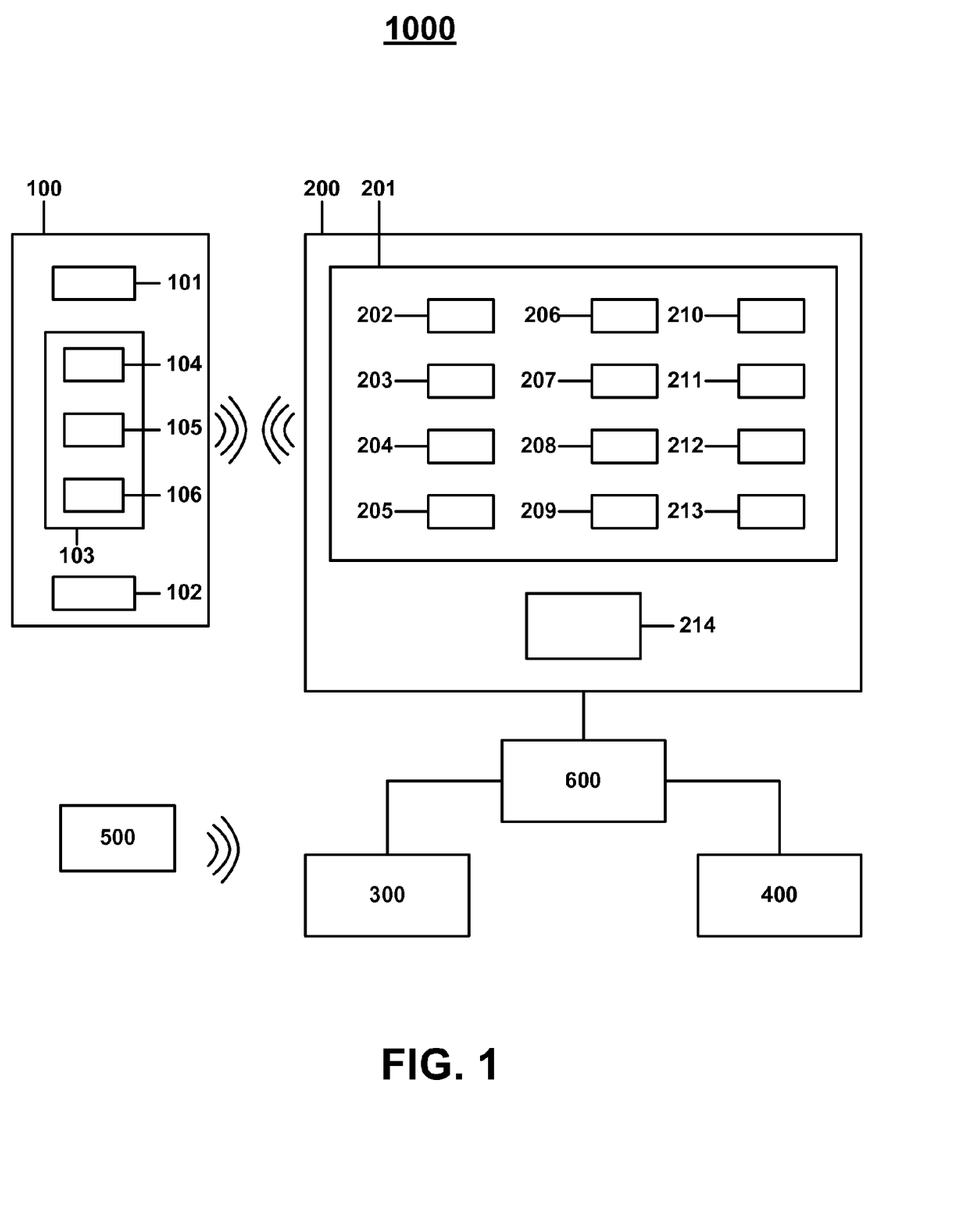
FIG. 1 is a block diagram of an example of a computing system for implementing a dynamic navigation service in accordance with an embodiment of the invention.

Turning now to FIG. 1, a block diagram of a computer system 1000 for implementing a dynamic navigation service is shown. The computer system 1000 may include a user device 100, a dynamic navigation service server 200, a public traffic system network 300, a private navigation system network 400, a global positioning system (GPS) satellite network 500, and the Internet 600.

The user device 100 may be, among other things, any programmable machine that may carry out a sequence of logical operations. Examples of the user device 100 may include a laptop, desktop, personal digital assistant (PDA), media player, a mobile Internet device (MID), any smart device such as a smart phone, smart tablet, smart TV, or the like. In this embodiment the computing device 100 may be a smart phone. The computing device 100 may include a user device interface 101, a user device processing component 102, and a user device memory component 103.

The user device interface 101 may be a component configured to allow a user to interact with the user device 100. For example, in this embodiment, the user device interface 101 may be a smart phone screen including a graphical user interface (GUI). In other embodiments, the user device interface 101 may be a laptop screen, a tablet device screen, a desktop monitor, or the like.

The user device processing component 102 may include at least one computer processor that may be utilized to execute computer-readable executable instructions. For example, as will be discussed in greater detail, the user device processing component 102 may be configured to execute various software applications relating to a dynamic navigation service.

The computing device memory device 103 may be any device configured to store data. In this case, the computing device memory device 103 may store, among other things, a interface application 104 and user device-side behavior data 105, and user locational information 106.

The interface application 104 may be an application directed to enabling a user to utilize a dynamic navigation service. For example, the interface application 104 may allow a user to, among other things, input direction inquiries and transmit said inquiries to the dynamic navigation service server 200.

The interface application 104 may also be configured to generate and store user device-side behavior data 105. The user device-side behavior data 105 may be any data relevant to the user's navigation behavior. For example, this may include, for example, the user-device side behavior data may indicate a user's navigational preferences (e.g., a route that avoids a known road closure, a route that is safer at night, etc.) and habits (e.g., the user's route from home to work, the user's use of back roads).

The interface application 104 may also be configured to generate user device-side behavior data 105 relating a user's primary location centers (e.g., a user's home address, work address, preferred grocery store, preferred shopping mall, or the like). The user's primary location centers may be determined, for example, evaluating the amount of time a user spends at a location or the time of day the user frequents the location. Specifically, for example, a user's residence may be determined by, among other things, determining the location wherein the user is located consistently during nighttime. The user device-side behavior data 104 may be periodically transmitted from the user device 100 to the dynamic navigation system server 200.

Furthermore, the interface application 104 may be configured to transmit the user locational information 106 as well. The user locational information 106 may be information relating to the user's current location. The user locational information 106 may be periodically transmitted from the user device 100 to the dynamic navigation system server 200.

The dynamic navigation service server 200 may be a computing system configured to, among other things, implement a dynamic navigation service. The dynamic service server 200 may include a dynamic navigation service server memory device 201 and a dynamic navigation service server processing component 214.

The dynamic navigation service server memory device 201 may be any device configured to store data. In this case, the dynamic navigation service server memory device 201 may include a dynamic navigation application 202, server-side user behavior data 203, associated community users 204, community user behavior data 205, and contextual data 206.

As will be discussed in greater detail, the dynamic navigation application 202 may be configured to, among other things, receive a direction inquiry from an inquiring user, access relevant information, and generate an inquiry result including suggested routes generated with respect to the inquiring user.

The server-side user behavior data 203 may be information pertaining the user. For example, the server-side user behavior data 203 may be generated based on periodic transmission of the user device-side behavior data 105 from the user device 100. Accordingly, the server-side user behavior data 203 may include, among other things, a user's navigational preferences, a user's navigational habits, and a user's primary location centers.

The associated community users 204 may be a community of users that may be associated with a locality in which that the user is traveling. The locality that the user is traveling in may be determined, for example, based on the user locational information 106.

So, for example, if the user is traveling in his own neighborhood (i.e., a user's primary location center) the associated communicated users 204 may be made up of him, his neighbors, and other users that frequent the neighborhood regularly. However, if the user is traveling in an unfamiliar neighborhood, the associated community users 204 may be made up of locals of the unfamiliar neighborhood, among others.

The associated community users 204 may be determined, for example, based on distance (e.g., a ten mile radius), or by city, town, or neighborhood boundaries. In another example, the associated community users 204 may be determined by the number of times a user frequents a locality during a given period of time (e.g., two times per day, five times per week, etc.).

In still another example, the associated community users 204 that frequent a locality may also be determined with regard to other considerations, such as context and timing considerations, as well. So, for example, the associated community users 204 may include users that frequent the locality during the day for work purposes, such as utility workers, taxi drivers, or the like.

A user may be verified prior to inclusion in the associated community users 204. For example, a user may be verified by utilizing user device information (e.g., transmission to and from a smartphone) to determine where a user resides (i.e., the locality wherein the user is located consistently during nighttime).

The community user behavior data 205 may be any data based on the navigation behavior of the associated community users 204. The navigation behavior may include the routes taken by the associated community users 204. In one example, the community user behavior data 205 may be aggregated by accumulating server-side user behavior data, such as the server-side user behavior data 203, for all of the associated community users 204. Also, as will be discussed in greater detail, the community user behavior data 205 may be aggregated from other coupled networks, such as the global positioning system (GPS) satellite network 500 and the Internet 600.

The contextual data 206 may include various data not pertaining to a user or associated community users that may be relevant to determining an optimal mapping to a destination. For example, the contextual data 206 may include traffic conditions (e.g., accidents, congestion, etc.), road conditions (e.g., construction, detours/closings, etc.), or other miscellaneous information (e.g., holidays/vacations, time of day, weather, etc.). The contextual data 206 may be gathered by accessing at least one coupled network, such as the public traffic system network 300, the private navigation system network 400, the global positioning system (GPS) satellite network 500, and the Internet 600.

The dynamic navigation service server memory device 201 may store additional information relevant to a dynamic navigation service as well. For example, in this example, the dynamic navigation service server memory device 201 may also include a user behavior algorithm 207, a user suggested route 208, a community user behavior algorithm 209, a community user suggested route 210, a composite behavior data algorithm 211, a composite suggested route 212, and an inquiry result communication 213.

The dynamic navigation application 202 may also utilize, among other things, the server-side user behavior data 203 to generate the user behavior algorithm 207. The user behavior algorithm 207 may implement an expression (e.g., quantitative, qualitative, category, type, etc.) based on the user's navigational behavior that may be utilized to determine the user's suggested route 208. The user's suggested route 208 may be an optimal route that should be suggested to the user.

The dynamic navigation application 202 may also utilize, among other things, the community user behavior data 205 to generate the community user behavior algorithm 209. The community user behavior algorithm 209 may be an expression (e.g., quantitative, qualitative, category, type) based on the associated community users' navigation behavior that may be utilized to determine the community user suggested route 210. The community user suggested route 210 may be an optimal route that should be suggested to the user.

So, in one example, the community user suggested route 210 may be determined by analyzing the community user behavior data 205 to determine roads most popular amongst the associated community users 204. In one example, the roads most popular amongst the associated community users 204 may then be aggregated to determine a popular route that may then be designated as the community user suggested route 210. The navigation habits of users that are not sufficiently affiliated with a locality (and thereby not included in the associated community users 204) may be less likely to be considered in determining the community user suggested route 210.

So, continuing with the example described above, if the user is traveling in one of his location centers (e.g., his own neighborhood), the community user suggested route 210 may be based on the most popular roads as driven by the associated community users 204 of his neighborhood. The associated community users 204 of his neighborhood may include, for example, himself, those in his own neighborhood, and those who frequent the neighborhood regularly (e.g., utility workers, taxi drivers, etc.).

On the other hand, if the user is traveling in an unfamiliar neighborhood, the community user suggested route 210 may be based on the most popular roads as driven by the associated community users 204 of the unfamiliar neighborhood. In this case, the associated community users 204 of the unfamiliar neighborhood may include those who reside in the unfamiliar neighborhood, and those who frequent the unfamiliar neighborhood regularly (e.g., utility workers, taxi drivers, etc.). Again, in some embodiments, the dynamic navigation application 202 may be configured to operate in a second mode, such as a passive mode, when operating in particular locations (e.g., such as a location unfamiliar to a user).

The dynamic navigation application 202 may further utilize, among other things, the server-side user behavior data 203 and the community user behavior data 205 to generate the composite behavior data algorithm 211. The composite behavior data algorithm 211 may be an expression (e.g., quantitative, qualitative, category, type) based on an optimal combination of the user behavior algorithm 207 and the community user behavior algorithm 209. The composite behavior data algorithm 211 may be utilized to determine the composite suggested route 212, which may represent an optimal route based on both the information pertaining to the user (e.g., the server-side user behavior data 203) and the information pertaining to the community users (e.g., the community user behavior data 205).

The dynamic navigation application 202 may also be configured to generate the inquiry result communication 213 for transmission to the user device 100 to respond to the user's inquiry. For example, the inquiry result communication 213 may include one or more of the user's suggested route 208, the community suggested route 210, and the composite suggested route 212.

The dynamic navigation service server processing component 214 may include at least one computer processor that may be utilized to execute computer-readable executable instructions. For example, dynamic navigation service server processing component 214 may be configured to execute the dynamic navigation application 202.

The public traffic system network 300 may be a network directed to servicing traffic that is operated by a public entity. Examples of the public traffic system network 300 may include a police network, a municipal traffic system network, or the like. The dynamic navigation application 202 may, for example, access the public traffic system network 300 via the Internet 600, to supplement the contextual data 206.

The private navigation system network 400 may be a network directed to a navigation service provided to a consumer that is operated by a private entity. The dynamic navigation application 202 may, for example, access the private navigation system network 400 via the Internet 600, to supplement the community user behavior data 206.

The GPS satellite network 500 may be a satellite navigation system directed to providing location and time information. The dynamic navigation application 202 may access the GPS satellite network 500 to, for example, supplement the server-side user behavior data 203 or the community user behavior data 205.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described in FIG. 1, the dynamic navigation application 202 may be located on the dynamic navigation service server 200, and may be configured to generate various navigation algorithms (e.g., the user behavior algorithm 207, the community user behavior algorithm 209) and transmit a navigation inquiry result communication (among other things). However, this need not necessarily be the case. In other embodiments, the functionalities offered by and the tasks performed by the dynamic navigation application 202 located on the dynamic navigation service server 200 may instead be offered and performed by the interface application on the user device (e.g., the dynamic navigation server interface application 104). That is, in other embodiments, the interface application may, for example, generate various navigation algorithms (e.g., the user behavior algorithm 207, the community user behavior algorithm 209) and generate a navigation inquiry result communication for display on a user device interface.

Also, for example, in some embodiments, a dynamic navigation application (e.g., the dynamic navigation application 202) may be configured to operate in different modes. For example, in a first mode the user may enable a cooperative configuration, wherein user device-side behavior data (e.g., the user device-side behavior data 105) and user locational information (e.g., the user locational information 106) of the user is continuously being transmitted to be accumulated at the dynamic navigation service server 200 as appropriate.

However, the user may also choose to enable a second mode, such as a passive mode, wherein the user is able to turn off the transmitting of the user device-side behavior data and the user locational information. In this second mode (i.e., the passive mode), the user may still be able to receive navigation services based on navigation practices of an associated community (e.g., a community user suggested route) despite not personally contributing behavior data and locational information.

Figure 2:
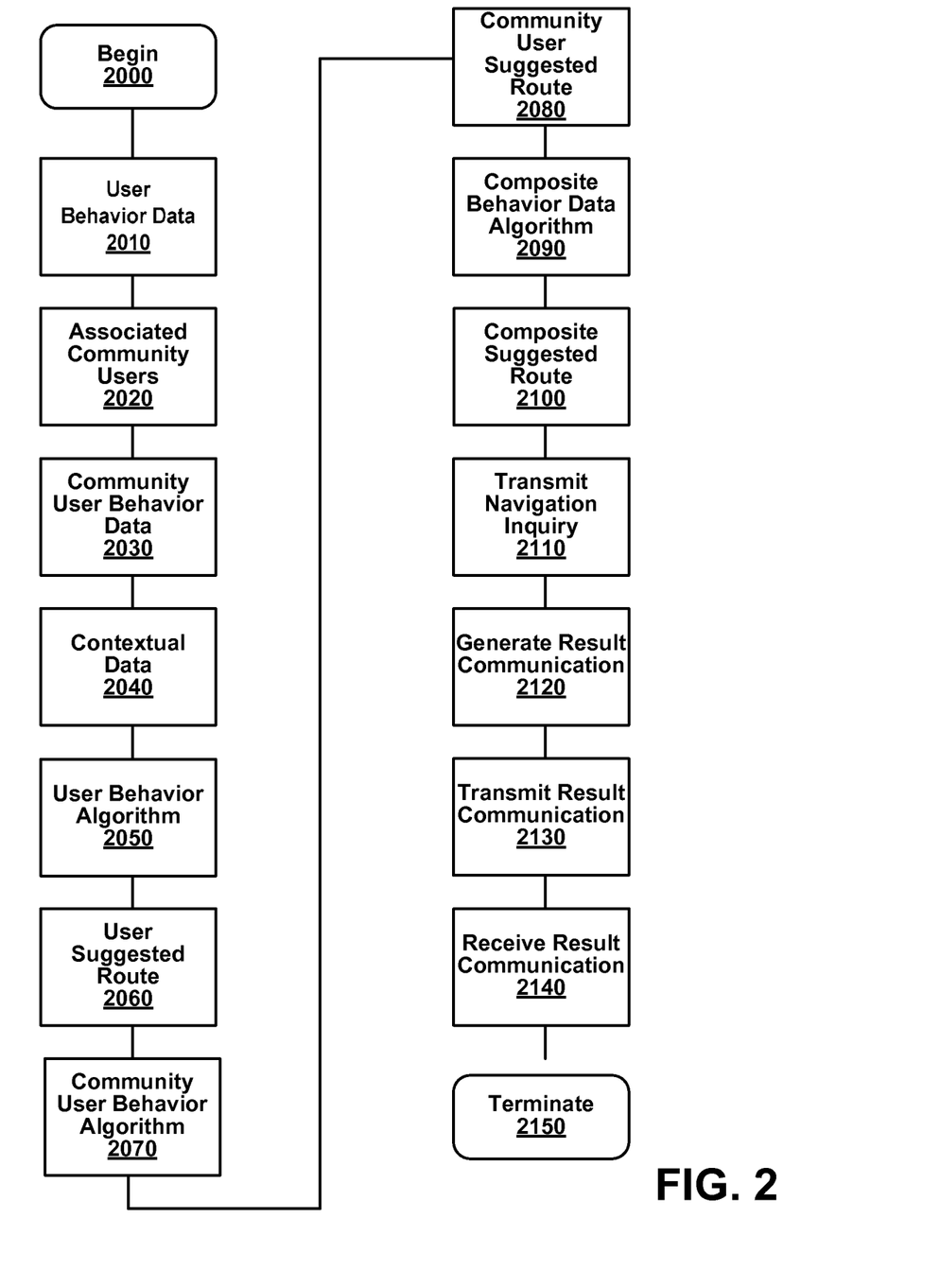
FIG. 2 is a flowchart of an example of a method of implementing a dynamic navigation service in accordance with an embodiment of the invention.

Turning now to FIG. 2, a flowchart of an example of a method of implementing a dynamic navigation service in accordance with an embodiment of the invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 2000. At processing block 2010, a user device, such as the user device 100, may utilize a dynamic navigation service interface application, such as the interface application 104 (FIG. 1), to generate user behavior data, such as the user device-side behavior data 105 (FIG. 1), relating to the user's navigation habits. The dynamic navigation interface application may periodically transmit the user behavior data, along with user locational information, such as the user locational information 106 (FIG. 1) to a dynamic navigation service server, such as the dynamic navigation service server 200 (FIG. 1).

At processing block 2020, the dynamic navigation service server may utilize server-side user behavior data, such as the server-side user behavior data 203 (FIG. 1), and a dynamic navigation application, such as the dynamic navigation application (FIG. 1), to determine associated community users, such as the associated community users 204 (FIG. 1). At processing block 2030, the dynamic navigation application may utilize the user locational information to generate community user behavior data, such as the community user behavior data 205 (FIG. 1), by utilizing data from various coupled networks, such as the private traffic system network 400 (FIG. 1). At processing block 2040, the dynamic navigation application may generate contextual data, such as the contextual data 206 (FIG. 1), by utilizing data from various coupled networks, such as the Internet 600 (FIG. 1).

At processing block 2050, the dynamic navigation application may utilize, among other things, the user behavior data to generate a user behavior algorithm, such as the user behavior algorithm 207 (FIG. 1). At processing block 2060, the dynamic navigation application may utilize the user behavior algorithm to generate a user suggested route, such as the user's suggested route 208 (FIG. 1).

At processing block 2070, the dynamic navigation application may utilize, among other things, the community user behavior data to generate a community user behavior algorithm, such as the community user behavior algorithm 209 (FIG. 1). At processing block 2080, the dynamic navigation application may utilize the community user behavior algorithm to generate a community user suggested route, such as the user suggested route 210 (FIG. 1).

At processing block 2090, the dynamic navigation application may utilize, among other things, the user behavior data and the community user behavior data to generate a composite behavior data algorithm, such as the composite behavior data algorithm 211 (FIG. 1). At processing block 2100, the dynamic navigation application may utilize the composite behavior data algorithm to generate a composite suggested route, such as the composite suggested route 212 (FIG. 1).

At processing block 2110, the user may generate and transmit a navigation inquiry communication requesting directions to a target destination utilizing the dynamic navigation service interface application. At processing block 2120, upon receiving the navigation inquiry communication from the user, the dynamic navigation application may generate an inquiry result communication, such as the inquiry result communication 213 (FIG. 1). The inquiry result communication may respond to the user's navigation inquiry by including the user suggested route, the community user suggested route, and the composite suggested route, among other things. At processing block 2130, the dynamic navigation application may transmit the inquiry result communication to the user device. At processing block 2140, the user may receive the inquiry result communication at the user device, and may view it using a user device interface, such as the user device interface 101 (FIG. 1). At processing block 2150, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 2, the dynamic navigation application may generate the user suggested route, the community user suggested route, and the composite suggested route for presentation to the user. However, this need not necessarily be the case. In other embodiments, the dynamic navigation application may be configured to generate other suggested routes. For example, the dynamic navigation application may be configured to generate a suggested route based on contextual data (e.g., traffic conditions, accidents, construction, and seasonal information).

Embodiments may therefore provide a method of implementing a dynamic navigation service, comprising generating user behavior data, wherein the user behavior data is based on navigation behavior of the user, generating user locational information, wherein the user locational information is based on a current location of the user, and transmitting a navigation inquiry communication including a request for directions. The method may also provide determining an associated community of users based on the user locational information, generating community user behavior data, wherein the community user behavior data is based on navigation behavior of the associated community of users, and generating a community user suggested route, wherein the community user suggested route is based on the community user behavior data.

In one example, the method may include generating an inquiry result communication, wherein the inquiry result communication includes the community user suggested route.

In one example, the method may include generating a user suggested route, wherein the user suggested route is based on the user behavior data, and wherein the inquiry result communication further includes the user suggested route.

In another example, the method may include generating a composite suggested route, wherein the composite suggested route is based on the user behavior data and the community user behavior data, and wherein the inquiry result communication further includes the composite suggested route.

Embodiments may also include at least one machine readable medium comprising a plurality of instructions that in response to being executed on a computing device, cause the computing device to carry out any of the examples of the aforementioned method, an apparatus for of implementing a dynamic navigation service including a user interface and logic configured to perform any of the examples of the aforementioned method, and a system for of implementing a dynamic navigation service including a user interface, a device memory, and logic configured to perform any of the examples of the aforementioned method.

Another embodiment may provide for a method of implementing a dynamic navigation service, comprising determining an associated community of users based on user locational information, generating community user behavior data, wherein the community user behavior data is based on navigation behavior of the associated community of users, and generating a community user suggested route, wherein the community user suggested route is based on the community user behavior data.

In one example, the method may include generating an inquiry result communication including the community user suggested route.

In one example, the associated community of users is determined based on a primary location center.

In still another example, the method may include generating contextual data, wherein the contextual data includes one or more of traffic conditions and road conditions.

In another example, the method may include receiving a navigation inquiry communication including a request for directions.

In still another example, the method may include receiving user behavior data, wherein the user behavior data is based navigation behavior of the user transmitting the navigation inquiry communication.

In another example, the method may provide generating a user suggested route, wherein the user suggested route is based on the user behavior data.

In still another example, the user behavior data includes one or more of a navigational preference and a navigational habit.

In still another example, the method may include generating a composite suggested route, wherein the composite suggested route is based on the user behavior data and the community user behavior data.

Embodiments may also include at least one machine readable medium comprising a plurality of instructions that in response to being executed on a computing device, cause the computing device to carry out any of the examples of the aforementioned method, an apparatus for of implementing a dynamic navigation service including a user interface and logic configured to perform any of the examples of the aforementioned method, and a system for of implementing a dynamic navigation service including a user interface, a device memory, and logic configured to perform any of the examples of the aforementioned method.

Another embodiment may provide a system comprising a user device and a dynamic navigation service server. The user device may include a user device interface, a user device processing component, a user device memory device, and a user behavior data module to generate user behavior data, wherein the user behavior data is to be based on navigation behavior of the user. The user device may also include a user locational information module to generate user locational information, wherein the user locational information is to be based on a current location of the user, a first transmitting module to transmit the user behavior data and the user locational information to a dynamic navigation service server, and a second transmitting module to transmit a navigation inquiry communication including a request for directions. The dynamic navigation service server may include a processing component, a memory device, a receiving module to receive the navigation inquiry communication, the user behavior data, and the user locational information transmitted from the user device, and an associated community module to determine an associated community of users based on the user locational information. The dynamic navigation service may also include a community user behavior module to generate community user behavior data, wherein the community user behavior data is to be based on navigation behavior of the associated community of users and a community route suggestion module to generate a community user suggested route, wherein the community user suggested route is to be based on the community user behavior data.

Embodiments may also provide at least one computer readable storage medium comprising a set of instructions which, if executed by a processor, cause a computer to determine an associated community of users based on user locational information, generate community user behavior data, wherein the community user behavior data is to be based on navigation behavior of the associated community of users, and generate a community user suggested route, wherein the community user suggested route is to be based on the community user behavior data.

Still another embodiment may provide an apparatus comprising a processing component, a memory device, and an associated community module to determine an associated community of users based on the user locational information. The apparatus may also include a community user behavior module to generate community user behavior data, wherein the community user behavior data is to be based on navigation behavior of the associated community of users and a community route suggestion module to generate a community user suggested route, wherein the community user suggested route is to be based on the community user behavior data.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention.

Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system, comprising:
    a user device including,
        a user device interface;
        a user device processing component;
        a user device memory device;
        a user behavior data module to generate user behavior data, wherein the user behavior data is to be based on navigation behavior of the user;
        a user locational information module to generate user locational information, wherein the user locational information is to be based on a current location of the user;
        a first transmitting module to transmit the user behavior data and the user locational information to a dynamic navigation service server; and
        a second transmitting module to transmit a navigation inquiry communication including a request for directions; and
    the dynamic navigation service server including,
        a processing component;
        a memory device;
        a receiving module to receive the navigation inquiry communication, the user behavior data, and the user locational information transmitted from the user device;
        an associated community module to determine an associated community of users based on the user locational information;
        a community user behavior module to generate community user behavior data, wherein the community user behavior data is to be based on navigation behavior of the associated community of users within a locality; and
        a community route suggestion module to generate a community user suggested route within the locality, wherein the community user suggested route is to be based on the community user behavior data.

2. The system of claim 1, wherein the dynamic navigation service server further includes a result module to generate an inquiry result communication, wherein the inquiry result communication is to include the community user suggested route.

3. The system of claim 2, wherein the dynamic navigation service server further includes a user suggested route module to generate a user suggested route, wherein the user suggested route is to be based on the user behavior data, and wherein the inquiry result communication is to further include the user suggested route.

4. The system of claim 3, wherein the dynamic navigation service server further includes a composite suggested route module to generate a composite suggested route, wherein the composite suggested route is to be based on the user behavior data and the community user behavior data, and wherein the inquiry result communication is to further include the composite suggested route.

5. A method of implementing a dynamic navigation service, comprising:
    determining an associated community of users based on user locational information, wherein the community of users are users who are affiliated with a locality based on residence within the locality or regular travel within the locality;

generating community user behavior data, wherein the community user behavior data is based on navigation behavior of the associated community of users within the locality; and generating a community user suggested route within the locality, wherein the community user suggested route is based on the community user behavior data.

6. The method of claim 5, including generating an inquiry result communication including the community user suggested route.

7. The method of claim 5, wherein the associated community of users is determined based on a primary location center.

8. The method of claim 5, including generating contextual data, wherein the contextual data includes one or more of traffic conditions and road conditions.

9. The method of claim 5, including receiving a navigation inquiry communication including a request for directions.

10. The method of claim 9, including receiving user behavior data, wherein the user behavior data is based navigation behavior of the user transmitting the navigation inquiry communication.

11. The method of claim 10, including generating a user suggested route, wherein the user suggested route is based on the user behavior data.

12. The method of claim 10, wherein the user behavior data includes one or more of a navigational preference and a navigational habit.

13. The method of claim 10, including generating a composite suggested route, wherein the composite suggested route is based on the user behavior data and the community user behavior data.

14. At least one non-transitory computer readable storage medium comprising a set of instructions which, if executed by a processor, cause a computer to:
determine an associated community of users based on user locational information, wherein the community of users are to be users who are affiliated with a locality based on residence within the locality or regular travel within the locality;
generate community user behavior data, wherein the community user behavior data is to be based on navigation behavior of the associated community of users within the locality; and
generate a community user suggested route within the locality, wherein the community user suggested route is to be based on the community user behavior data.

15. The at least one computer readable storage medium of claim 14, wherein, if executed, the instructions cause a computer to receive a navigation inquiry communication including a request for directions.

16. The at least one computer readable storage medium of claim 14, wherein, if executed, the instructions cause a computer to generate an inquiry result communication including the community user suggested route.

17. The at least one computer readable storage medium claim 14, wherein, if executed, the instructions cause a computer to generate contextual data, wherein the contextual data is to include one or more of traffic conditions and road conditions.

18. The at least one computer readable storage medium of claim 14, wherein, if executed, the instructions cause a computer to receive user behavior data, wherein the user behavior data is to relate to the user's navigation behavior.

19. The at least one computer readable storage medium of claim 18, wherein, if executed, the instructions cause a computer to generate a user suggested route, wherein the user suggested route is to be based on the user behavior data.

20. The at least one computer readable storage medium of claim 18, wherein the user behavior data is to include one or more of a navigational preference and a navigational habit.

21. The at least one computer readable storage medium of claim 20, wherein, if executed, the instructions cause a computer to generate a composite suggested route, wherein the composite suggested route is to be based on the user behavior data and the community user behavior data.

22. An apparatus, comprising:
a processing component;
a memory device;
an associated community module to determine an associated community of users based on the user locational information, wherein the community of users are to be users who are affiliated with a locality based on residence within the locality or regular travel within the locality;
a community user behavior module to generate community user behavior data, wherein the community user behavior data is to be based on navigation behavior of the associated community of users within the locality; and
a community route suggestion module to generate a community user suggested route, wherein the community user suggested route within the locality is to be based on the community user behavior data.

23. The apparatus of claim 22, further including a receiving module to receive the navigation inquiry communication, the user behavior data, and the user locational information transmitted from the user device.

24. The apparatus of claim 22, wherein the dynamic navigation service server further includes a user suggested route module to generate a user suggested route, wherein the user suggested route is to be based on the user behavior data.

25. The apparatus of claim 22, wherein the dynamic navigation service server further includes a result module to generate an inquiry result communication, wherein the inquiry result communication is to include the community user suggested route.

26. The apparatus of claim 25, wherein the inquiry result communication is to further include a user suggested route.

* * * * *